C. O. NESS.
HARNESS PAD.
APPLICATION FILED SEPT. 7, 1912.
1,111,402.
Patented Sept. 22, 1914.
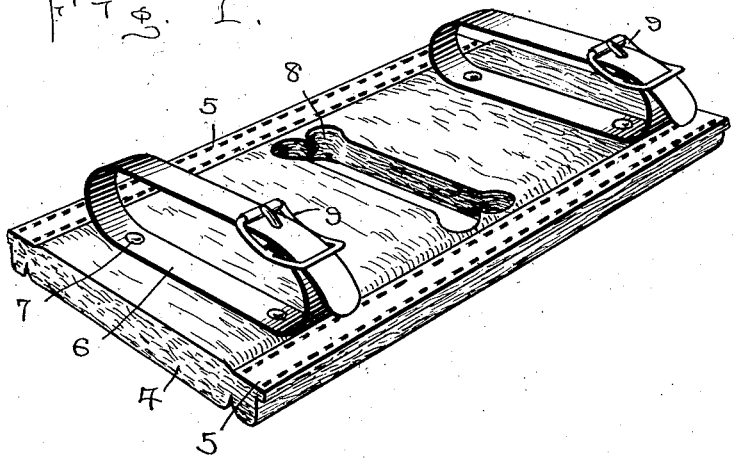
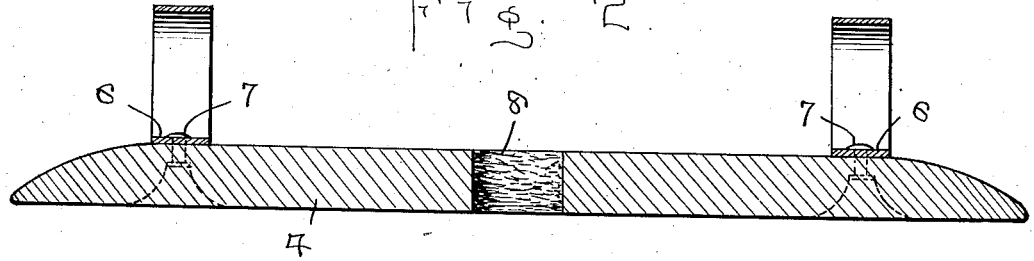
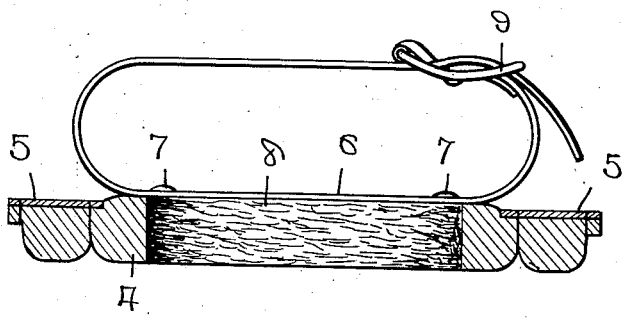

UNITED STATES PATENT OFFICE.

CARL O. NESS, OF WATERVILLE, IOWA.

HARNESS-PAD.

1,111,402.   Specification of Letters Patent.   Patented Sept. 22, 1914.

Application filed September 7, 1912. Serial No. 719,210.

*To all whom it may concern:*

Be it known that I, CARL O. NESS, a citizen of the United States, residing at Waterville, in the county of Allamakee and State of Iowa, have invented certain new and useful Improvements in Harness-Pads; and I do hereby declare the following to be a full, clear, and exact description of the invention, such as will enable others skilled in the art to which it appertains to make and use the same.

My invention relates to harness pads and particularly to neck pads adapted to be secured to harness collars.

An object of the invention is to provide a pad formed of inexpensive unwoven fibrous material reinforced against tearing by strips, certain of the strips consisting of securing means for the pad.

A further object of the invention is to provide a pad adapted to have interior portions thereof cut away so as not to irritate any adjacent sore places upon the body of the animal upon which the pad is used.

Other objects and advantages will be hereinafter made clearly apparent in the specifications and claim.

In the accompanying drawings I have shown the preferred form which my invention may take.

In said drawings, Figure 1 is a perspective view showing a portion of a pad constructed in accordance with my invention. Fig. 2 is a longitudinal sectional view therethrough, and, Fig. 3 is a transverse sectional view therethrough.

Referring to the drawings by numerals of reference, the same numeral designating corresponding parts throughout the several views, 4 is a pad, which is formed of the desired width and length and of an inexpensive unwoven fibrous material. A strip of leather 5 is placed on the upper surface and at each side of the pad and is preferably stitched thereto. As shown in the drawing I stitch the strip 5 along both edges. The stitches extend completely through the adjacent portions of the pad and are drawn very tight so that the said edges of the pad are rounded, as clearly shown in Fig. 3 of the drawing. The ends of the pad are preferably thinned or tapered, as clearly shown in Fig. 2, so as to appear neater and rest more closely against the sides of the animal.

In order to prevent the pad from tearing on a line between the strips 5 and also to permit the same to be secured in place upon the desired portion of the harness, I secure straps 6 to the upper surface and transversely of the pad by means of rivets 7, which latter are located adjacent the strips 5 and are drawn very tight so that the inner end of the rivet is spaced a considerable distance from the engaging surface of the pad, so that there is no danger of the end of the rivet touching the back of the animal. If desired the strips 5 may be secured to the edges of the pad in any other desired manner, as by means of rivets similar to the rivets 7.

The central portion of the pad is preferably formed with an opening 8 of any desired suitable size, which will allow the pad to be more easily bent and the pad may also be provided with other openings at desired points to prevent the pad from engaging sore spots upon the back of the animal. The securing strap is provided with buckles 9 or other desired securing devices, whereby the ends of the strap may be secured together.

By the construction of a pad herein described it will be seen that I am enabled to employ inexpensive fibrous material in the manufacture of pads and by the arrangement of reinforcing strips I obtain a pad of great strength.

What I claim as new is,

A pad comprising an unwoven fabric body, flat strengthening strips arranged on the upper surface of said body and along the longitudinal edges thereof, stitches securing the outer longitudinal edges of said strips to the adjacent edges of the body and materially reducing the thickness of the secured edge of the body, stitches securing the inner edges of the strips to the adjacent portions of the body and forming rounded edges on the latter to prevent chafing, straps disposed transversely of the pad and in spaced relation to the ends thereof, means securing said straps to said body at points adjacent said strips, and fastening means carried by the free ends of said straps for securing said pad in position.

In testimony whereof I have signed my name to this specification in the presence of two subscribing witnesses.

CARL O. NESS.

Witnesses:
B. J. DILLON,
J. H. LARKIN.